Nov. 28, 1939.  W. JOHNSTON, JR  2,181,331
CINDER POT
Filed Aug. 23, 1938

INVENTOR
William Johnston, Jr.
by Christy & Wharton
his Attorneys

Patented Nov. 28, 1939

2,181,331

UNITED STATES PATENT OFFICE 2,181,331

CINDER POT

William Johnston, Jr., Wilkinsburg, Pa.

Application August 23, 1938, Serial No. 226,274

2 Claims. (Cl. 266—39)

This invention relates to a pot for molten metals and slags, being primarily of the sort known as cinder pots, and constituting an improvement on the structure disclosed in my prior patent, No. 2,057,528, dated August 13, 1936.

As in my prior patent to which reference has been made, the pot of my present invention is a metallic pot, desirably formed in one piece by casting, and the side wall of the pot is corrugated. I have, however, discovered that in pots of this general type, an additional and important advantage is gained by forming the inwardly and outwardly projectant bows which corrugate the side wall of the pot on different radii alternately around the pot. This advantage will be more specifically discussed later herein; but it may be here said that such corrugated arrangement of the side wall of a metallic pot, when used as a cinder or slag pot, or as a container for molten metal, results in facilitated dissipation of heat through the side wall of the pot and in the avoidance of localized overheating in the side wall of the pot. This advantage is obtained, whether the pot be used for cinder and slag, or for molten metals, and whether the pot retains the metal or slag for a relatively long or short period of time during the dissipation of heat from the material contained in the pot.

Figure 1:
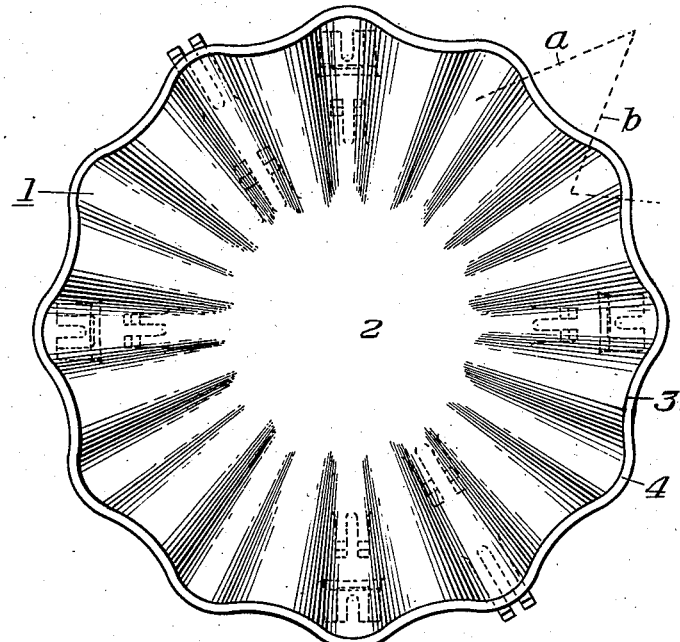
Figure 2:
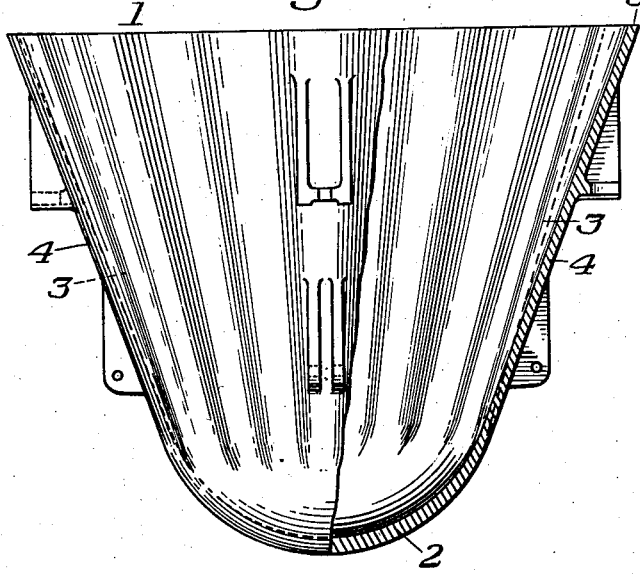
Figure 3:
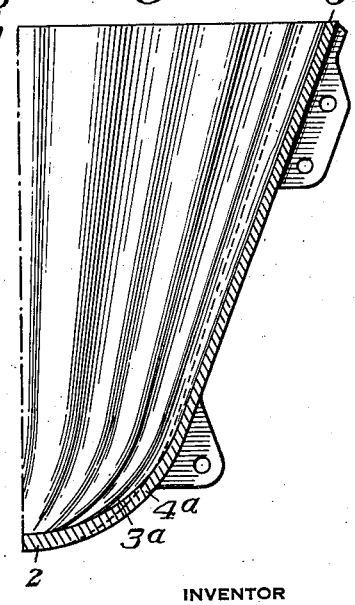

In the accompanying drawing, Fig. 1 is a plan view of the cinder pot of my invention; Fig. 2 is a view showing the cinder pot partly in elevation and partly in vertical section; Fig. 3 is a fragmentary vertical sectional view, showing modification in the mergence of the upper region of the pot and the pot bottom.

In the drawing reference numeral 1 designates generally the side wall of the cinder pot, which wall is primarily circular in horizontal section, and in its lower region merges into the bottom 2 of the pot. As shown, the side wall of the cinder pot is upwardly divergent about its circumference from the vertical axis of the pot. Desirably, as shown, this upward divergence has a substantial angular value from its lower starting point, as I have found it desirable to present a proportionally great area, open to the cooling effect of the atmosphere, within the upper edge of the cinder pot.

The side wall of the cinder pot is circumferentially corrugated to form bows 3 inwardly projectant toward the vertical axis of the pot, and bows 4 outwardly projectant therefrom, these inwardly and outwardly projectant bows alternating throughout the circumference of the pot. The bows 3 and 4, giving a corrugated character to the side wall of the cinder pot may extend vertically of the pot any desired distance. In Fig. 2 they are shown as decreasing in width and depth downwardly from the edge of the pot to a lower-lying zone at which they terminate; while in Fig. 3 of the drawing they are extended along the bottom of the pot. In the modification of Fig. 3 the portions of the bows 3 and 4 lying in that portion of the pot which may be considered to be a spheroidal bottom, are designated specifically by reference numerals 3a and 4a. It is to be understood, however, that in their downward extent from the upper edge 5 of the cinder pot the bows 3 and 4 may, if desired, be terminated in some zone higher than that in which they are shown as terminated in Fig. 2 of the drawing.

It is a fact that when the side wall of a cinder pot is simply corrugated to provide inwardly and outwardly projecting bows of equal depth and equal extent circumferentially of the pot, the corrugated structure of the pot wall serves to increase the life of the pot, by providing an accommodation to thermal contraction and expansion, by structurally stiffening the pot, and by providing in a pot of given overall dimensions an increased heat radiating surface. Specifically to consider, however, the effect of a corrugated side wall, I have found that in pots of this character localized overheating in the inwardly projectant bows of the corrugated portion of the side wall tends in measure to decrease the useful life of a corrugated pot below the theoretically obtainable maximum.

Functionally to consider a pot having a uniformly corrugated primarily circular side wall, it is neecssary that the bows constituting the corrugation be formed on relatively short radii, in order that substantial benefit be derived from corrugating the wall. In a structure so organized, the outer surface of each of the inwardly bowed wall regions is, therefore, hemmed in, or dominated by the adjacent outer surfaces of the outwardly bowed wall regions lying to both sides.

By my continued experience with pots of this characer, and from following many of such pots in service, I have discovered that heat in radiating from the outer surface of the pot wall does not radiate along projected radii of the pot as a whole; but that, on the contrary, heat radiation from the pot is directed by the wall contour in any given region of the pot wall. When, therefore, the side wall of the pot is uniformly corrugated, heat radiates substantially along lines directed as are the lines $a$ and $b$ (see Fig. 1 of the drawing) from the outwardly bowed regions 4 of the corrugated side wall region 4, is so directed that the heat rays intersect too close to the side wall of the pot, and tend to form a hot spot in the embraced inwardly bowed region. This tends to retard dissipation of heat in such region, and thereby tends locally to overheat it. Such localized overheating creates a tendency for the metal of the inwardly bowed regions, particularly at their inwardly presented surfaces, to deteriorate more rapidly in service than the metal in the other regions of the side wall.

I have found that by forming the inwardly projected bows of the corrugated side wall on radii greater than those on which the intervening outwardly projected bows are formed, this disadvantageous feature of a corrugated pot is eliminated, and have found that this may be done without great sacrifice in the fundamental advantage gained by corrugating the side wall of the pot. In thus solving the problem it is important that the radius on which each inwardly projectant bow to be formed, exceed the radii of the adjacent outwardly projectant bows enough to prevent the formation of a destructive heat-pocket, but that the difference in radius should not be so great as to negative the advantages derived from a corrugated wall.

My experience has led me to prefer a proportioning of radii, as between the radius on which the inwardly projectant bows are formed, which and that on which the outwardly projectant bows are formed lies within the range of from a ratio of 3:2 to a ratio of 5:2. Referring to Fig. 1 of the drawing, if we assume that the maximum diameter of the pot is 12 feet, the relationship as shown in Fig. 1 would indicate a major radius of about 30 inches for the inwardly projected bows, and a major radius of about 14 inches for the outwardly projectant bows. We may assume that the pot as specifically herein illustrated is designed for metal at a very high temperature. If then the conditions of service are such that the pot will not be used for metal or slag at such high temperature, the difference between the radii upon which the corrugated side wall of the pot is formed may advantageously be decreased.

By the corrugated arrangement described above, the pot wall combines the advantage of relatively deep and short outward bows with the advantage of inward bows sufficiently shallow and elongate to prevent the formation of destructive heat pockets in such regions. The inwardly projectant bows, individually considered, give a reverse curvature of sufficient value to preserve in the pot the advantage generally attendant upon providing it with a corrugated side wall.

I have discovered from experience that when metallic pots are used for slag, in cooling of the slag there is a region of prolonged high temperature, which may be termed the "critical heat zone", in the interior of the pot. This "critical zone", the vertical position of which is determined by the cooling effect at the upper open end of the pot and the cooling effect in the lower region of the pot, is thus varied in its vertical position with the shape and capacity of the pots, and is determinable with relation to the anticipated conditions of pot service by a cinder pot designer skilled in the art. In a corrugated pot of this nature, I have found that the side wall of the pot should be corrugated downwardly for some distance below this "critical heat zone", in order that the benefit of corrugating the pot wall may be had in that region of the pot where it is most needed. If, then, the service conditions to which the pot is to be subjected are known, and if predetermined position of the "critical zone" will be high under such service conditions, the corrugation of the side wall may be terminated higher than is indicated in Fig. 2. If the anticipated service conditions for the pot are particularly severe, it may be desirable to corrugate the pot in a manner as extreme as that shown in Fig. 3 of the drawing.

I claim as my invention:

1. A metallic pot for hot metals, slags and the like having a side wall corrugated into bows vertically extended in the side wall and alternately inwardly and outwardly projectant from a mean periphery of the wall, the said inwardly projectant bows being formed on radii greater than those on which the outwardly projectant bows are formed, to obtain the benefit of substantial depth in the outwardly projectant bows without causing such concentration of tangentially directed heat radiation from outwardly projectant bows as substantially to retard heat radiation at the said inwardly projectant bows.

2. A metallic pot for hot metals, slags and the like having a side wall corrugated into bows vertically extended in the side wall and alternately inwardly and outwardly projectant from a mean periphery of the wall, the said inwardly projectant bows being wider than the said outwardly projectant bows, to obtain the benefit of substantial depth in the outwardly projectant bows without causing such concentration of tangentially directed heat radiation from outwardly projectant bows as substantially to retard heat radiation at the said inwardly projectant bows.

WILLIAM JOHNSTON, Jr.